(No Model.) 2 Sheets—Sheet 1.
F. W. CALAIS.
CHECK ROW ATTACHMENT FOR SEED PLANTERS.
No. 297,110. Patented Apr. 22, 1884.
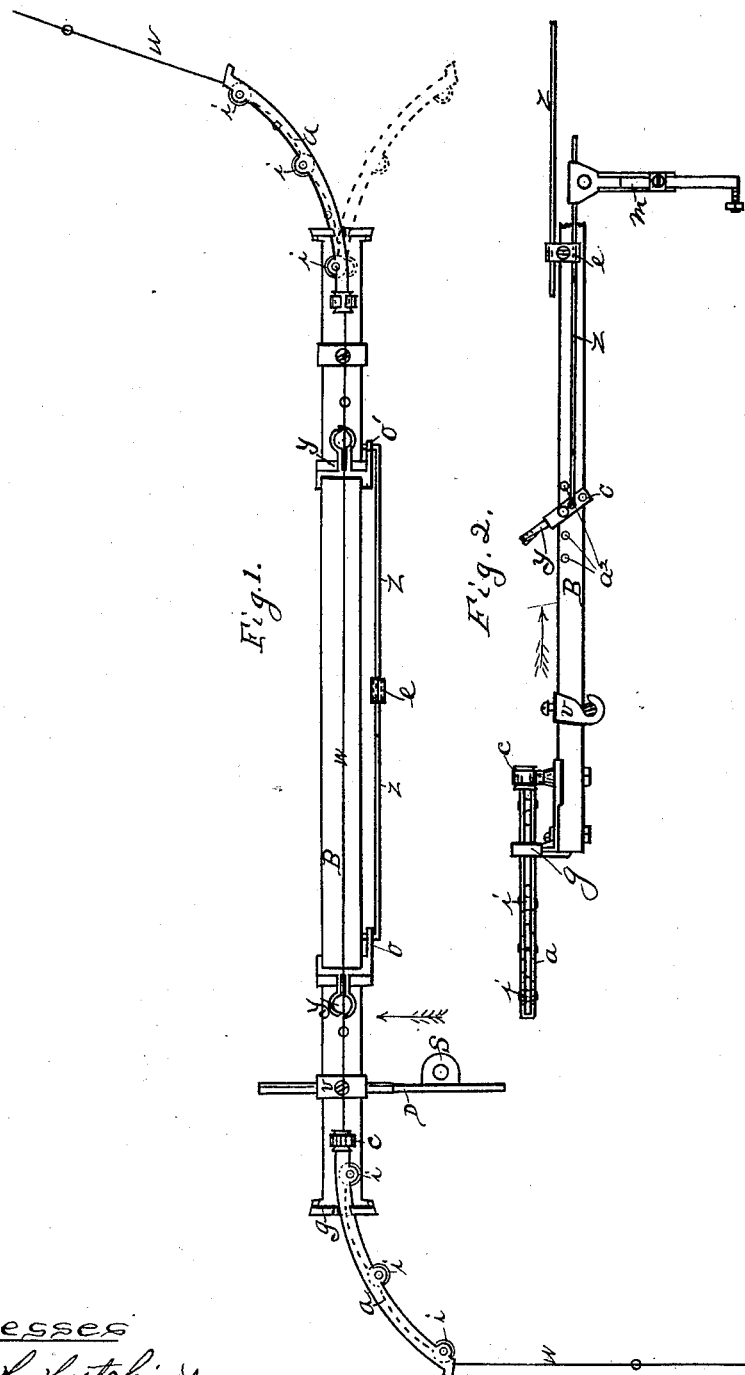
Witnesses
Thos. L. Hutchins.
Wm. J. Hutchins.
Inventor,
Frank W. Calais.

(No Model.) 2 Sheets—Sheet 2.
F. W. CALAIS.
CHECK ROW ATTACHMENT FOR SEED PLANTERS.
No. 297,110. Patented Apr. 22, 1884.
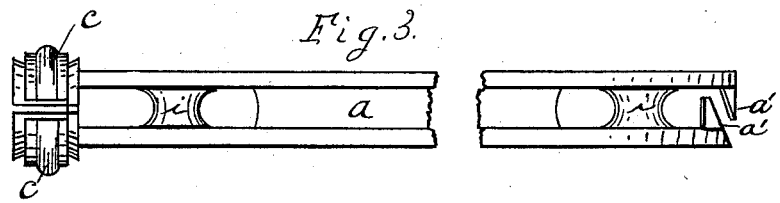
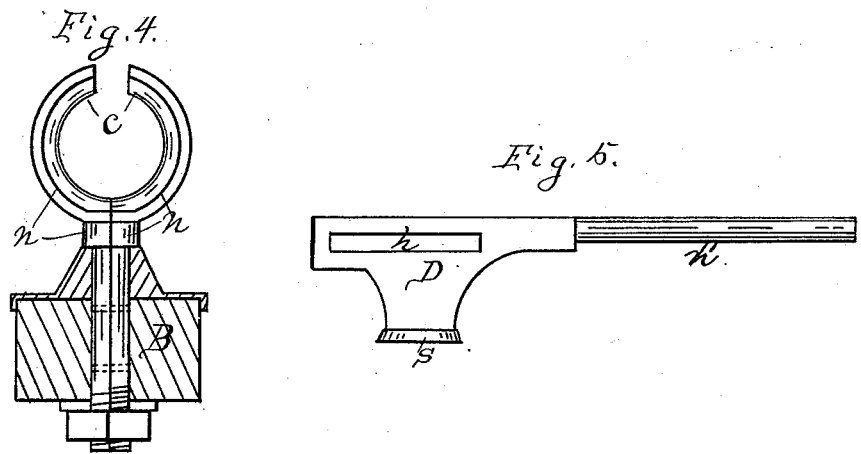
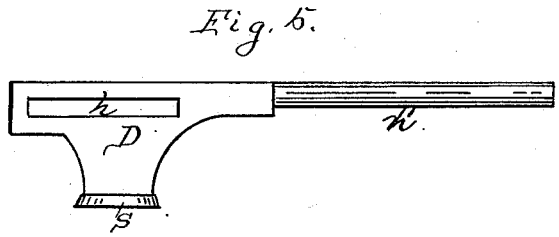
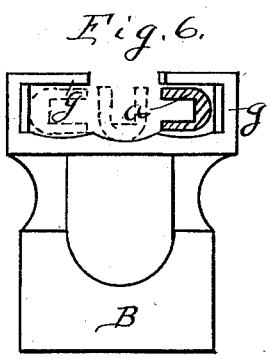
Witnesses.
Thos. H. Hutchins
Wm. J. Hutchins
Inventor.
Frank W. Calais.

UNITED STATES PATENT OFFICE.

FRANK W. CALAIS, OF JOLIET, ILLINOIS.

CHECK-ROW ATTACHMENT FOR SEED-PLANTERS.

SPECIFICATION forming part of Letters Patent No. 297,110, dated April 22, 1884.

Application filed January 20, 1883. (No model.)

*To all whom it may concern:*

Be it known that I, FRANK W. CALAIS, of the city of Joliet, in Will county, and State of Illinois, have invented certain new and useful Improvements in Check-Row Attachments for Seed-Planters, the construction and operation of which I will proceed to explain, reference being had to the annexed drawings and the letters and figures thereon, making a part of this specification, in which—

Figure 1 is a plan view; Fig. 2, a side elevation of a part of one end of the machine; Fig. 3, a side view of the swinging guide that guides the knotted wire across the machine; Fig. 4, a front view of the standard in which the inner end of the swinging guide is swiveled; Fig. 5, a side view of the casting supporting the check-row attachment, and by which it is attached to the planter; and Fig. 6, the rest that supports the swinging guide.

This invention relates to certain improvements in that class of machines called "check-row attachments for seed-planters," and is adapted to attach to any ordinary corn or seed planter, and is operated by a knotted rope or wire stretched stationary across the field, causing the machine to actuate the dropping portion of the planter to drop the seed in hills and rows either way, without having to mark the ground in advance.

Referring to the drawings, B represents the main beam of the machine, which bears the working parts, and that attaches to the machine below by means of the casting D and clip $v$, said casting D being shown particularly in Figs. 1 and 5.

As both ends of this device are alike, it will not be necessary to describe more than one end in detail.

The knotted wire $w$ crosses the machine, entering it through one of the curved swinging guides $a$ at one end of the machine, then passing on through the bows of the oscillating yokes $y\ y$, and out through the other swinging guide $a$ at the opposite end of the machine, as shown particularly in Fig. 1. These bent or curved conducting-guides $a$ form a sort of spout to conduct the wire $w$ over a series of small friction-rollers, $i$, along their interior length. The outer ends of these guides $a$ are formed, as shown in Fig. 3, having the diagonal slot or opening formed by the two projecting prongs $a'\ a'$, which serve to hold the wire $w$ in the guide $a$. The swinging guide $a$ is curved, so it will more readily conduct the wire $w$ through it as it passes along over the friction-rollers $i$ as the machine moves along in the direction of the arrow.

The particular new feature in the guide-arm $a$ is the manner in which its inner end is hinged or swiveled to the machine, and then the manner in which it is supported and prevented from turning by means of the rest or support $g$. (Shown more particularly in Fig. 6.)

In order to hinge the swinging arm $a$ to the machine, the inner end is inclosed between a pair of jaws, $n\ n$, as shown more particularly in Figs. 3 and 4. The jaws $n\ n$ do not meet at the top, for the purpose of leaving an opening or slot, $c$, to permit the wire $w$ to be inserted into the guide $a$ through a corresponding slot in the end inclosed by the jaws $n\ n$, as shown in Fig. 3. The wire $w$ is intended to be inserted while the curved guide lies on its back and its outer end turned up, for at that time the said two slots or openings are opposite each other, as shown in said Fig. 3. Such construction also prevents the escape of the wire $w$ from the swinging guides as they swing from side to side. In order to support the said arm $a$ and prevent its rotation when not desired, and while the machine is traveling, the rest B (shown in Fig. 6 more particularly) is used.

The rest B is provided in its upper end with a transverse slot, in which the guide $a$ moves from one side to the other, as shown in said Fig. 6. The width of the said slot corresponds with the thickness of the arm or guide $a$, so that when it is moved to either end of the said slot it cannot rotate while in such place. The upper central portion of the rest B above the said slot is removed, as shown in said Fig. 6, so that the guide $a$ may be rotated while in such removed part, and so it can lie on its back, as shown in said Fig. 6, to permit the wire $w$ to be placed in the guide $a$.

The wire $w$ cannot escape from the guide $a$, except when it lies on its back, which would be at a time when the machine is at rest, and it is desired to either insert or remove it from the machine. By this arrangement the wire $w$ need not be removed from the machine when it is turned about to return. I am aware swinging guides for this purpose have been used, but not swiveled at the inner end to the machine, between a pair of jaws, like this, or having a lock-rest, B, to hold it locked, so it cannot rotate when not desired or when the machine is traveling, and so the guide will not droop down until the wire $w$ is slackened, when the machine is turned about. This is of great advantage, as it permits the guides to reverse their position automatically in returning.

The yokes $y\ y$ are pivoted to the side of the beam B in such manner that they may oscillate to and from each other simultaneously by means of the knots on the wires $w$ as it passes along through the yokes, and the yokes are connected with each other by the pitmen $z\ z$, near their inner ends, by the clasp $e$ clasping them firmly together. These yokes $y$ are furnished at their outer side with a crank, $o$ and $o'$.

The pitman $z$ is connected to the crank $o$ at a point below the pivot upon which the yoke oscillates, while the other pitman is connected to crank $o'$ above said pivot. As the wire passes along, a knot in it will carry the yoke $y$, Fig. 2, forward, as shown by the dotted lines, until it leans so far over that the knot escapes through the bow of the yoke. By such movement both yokes lean toward each other on account of their being so connected by the pitmen $z\ z$. As a knot passes along, it will engage with the opposite yoke and return it to its original position, so they lean from each other, as shown in Fig. 1, and so they will oscillate alternately to and from each other, as each knot on the wire $w$ passes through the machine. At each oscillation the drop-lever $m$, which is attached to one of the connecting-rods $z$, and connects with the seed-slide of the planter below, causes seed to be dropped in hills as near together as half the distance between the knots on the wire $w$.

The beam B attaches to the planter by means of the casting D. (Shown more particularly in Fig. 5.) The projecting lug $s$ having an eye permits it to be bolted down on the frame of the machine below, while the slot $h$ therein permits it to be bolted to the side of the seed-boxes, and the beam B is attached to it by means of the clip $v$, Fig. 2, hooking around its projecting arm $n'$, and brought up close by means of a set-screw in the top of said clip, as shown in said Fig. 2. For the purpose of dropping the hills near or farther apart, the yokes $y$ may be moved along to or from each other by being hinged in any one of the row of holes along in the beam B, (shown in Fig. 2, at $a^2$,) the clamp $e$ having been first loosened to permit such movement. The row of holes $a^2$ in the beam B permits the yokes $y$ to be moved to or from each other. In this machine one knot on the wire $w$ makes two drops, and the knots are as far again apart as the yokes $y\ y$ are from each other, so that when the yokes are moved to or from each other by means of the row of holes $a^2$ in the beam B, a wire must be used having knots to correspond with the distance apart of the yokes, so that, to change the distance apart of the hills, the yokes must not only be moved to or from each other but a wire must be used having its knots correspond in distance apart with the distance apart the yokes are set.

The jaws $n$, between which the inner end of the guides $a$ are clasped, stand in the beam B, so they will rotate partially as the guides reverse their position. The jaws $n$ present a convex face to the concave surface of the end of the guide it clasps, so that the joint thus formed is universal.

Having thus described my invention, what I claim as new, and desire to secure by Letters Patent, is as follows, to wit:

1. In a check-row attachment for seed-planters, the combination of the beam B, having the row of holes $a^2$, oscillating yokes $y\ y$, pitmen $z\ z$, clasp $e$, drop-lever $m$, standard $c$, slotted curved rotating guides $a$, hinged between the jaws $n\ n$, and having a series of friction-rollers, $i$, and guide-rest $g$, having the slot in its upper end for the reception of the guide $a$, all adapted to operate in the manner and for the purpose set forth.

2. In the check-row attachment described, the jaws $n\ n$, having the slot $c$ between their upper ends, in combination with the swinging guides $a$, having a corresponding slot in their inner end inclosed by said jaws and adapted to receive the wire $w$ through said corresponding slots, as and for the purpose set forth.

FRANK W. CALAIS.

Witnesses:
 THOS. H. HUTCHINS,
 WM. J. HUTCHINS.